United States Patent [19]

Spencer

[11] Patent Number: 4,510,935
[45] Date of Patent: Apr. 16, 1985

[54] CARDIAC DEFIBRILLATOR

[75] Inventor: Joseph Spencer, London, England

[73] Assignee: Cardiac Recorders Limited, London, England

[21] Appl. No.: 430,251

[22] Filed: Sep. 30, 1982

[30] Foreign Application Priority Data

Oct. 28, 1981 [GB] United Kingdom ............... 8132459

[51] Int. Cl.³ ............................................. A61N 1/36
[52] U.S. Cl. ........................ 128/419 D; 128/419 PS;
310/339; 322/35
[58] Field of Search ......... 128/419 PS, 419 D, 419 R;
604/69; 310/339, 10, 12–15; 322/3, 100, 1,
DIG. 1, 47, 2 R, 2 A, 4, 35

[56] References Cited

U.S. PATENT DOCUMENTS

| | | |
|---|---|---|
| 2,827,851 | 3/1958 | Ferrara . |
| 2,970,545 | 2/1961 | Howl . |
| 3,168,660 | 2/1965 | Marks . |
| 3,257,905 | 6/1966 | Weisman et al. ...................... 310/14 |
| 3,337,760 | 8/1967 | Allport ................................. 310/13 |
| 3,356,869 | 12/1967 | Hilton et al. ............................. 322/1 |
| 3,389,704 | 6/1968 | Buchowski et al. ............ 128/419 D |
| 3,430,080 | 2/1969 | Horan ................................... 310/339 |
| 3,500,078 | 3/1970 | Buser et al. ........................... 310/13 |
| 3,554,199 | 1/1971 | Auphan ......................... 128/419 PS |
| 3,693,625 | 9/1972 | Auphan ......................... 128/419 PS |
| 3,876,925 | 4/1975 | Stoeckert ............................... 322/1 |
| 3,913,588 | 10/1975 | Klomp ............................. 128/419 D |
| 3,967,141 | 6/1976 | Gawlick et al. ..................... 310/339 |
| 4,090,448 | 5/1978 | Rose et al. ........................... 310/339 |
| 4,121,123 | 10/1978 | Crolius ................................. 310/10 |

FOREIGN PATENT DOCUMENTS

| | | |
|---|---|---|
| 1213660 | 11/1970 | United Kingdom . |
| 1360305 | 7/1974 | United Kingdom . |
| 2035089 | 6/1980 | United Kingdom ............ 128/419 R |

Primary Examiner—William E. Kamm
Assistant Examiner—Mitchell J. Shein
Attorney, Agent, or Firm—Sandler & Greenblum

[57] ABSTRACT

An electrical energy source, particularly suitable for portable emergency equipment such as cardiac defibrillators, uses a small explosive charge of which the energy is converted into a short intense electrical pulse by an electromechanical convertor for example a piezoelectric transducer.

16 Claims, 8 Drawing Figures

CARDIAC DEFIBRILLATOR

This invention relates to power sources suitable for use in cardiac defibrillators and other devices requiring the delivery of a short intense burst of electrical energy.

Conventional defibrillators are expensive and quite heavy. Both the cost and the weight arise largely from the energy supply arrangements used at present. In conventional defibrillators, electrical energy from a primary or secondary battery or a mains-operated rectifier is used to charge a large capacitor. When the defibrillator is used, the accumulated charge is released through a relay switch into the patient. The energy supply components in particular the capacitor and relay, are relatively large, heavy and costly. Mains-operated defibrillators have the disadvantage of being portable only to a limited extent. Battery-operated defibrillators require battery chargers, or frequent replacement of expensive primary batteries, as battery capacity decreases even when the defibrillator is not in use.

Conventional defibrillators, even the portable types, are therefore of only limited availability, and in particular are too expensive for widespread use.

According to the present invention, an electrical energy source for delivering short intense electrical pulses comprises an explosive device and an electromechanical convertor exposed to the explosive device, for producing an electrical output when stressed by explosion of the said device.

The electromechanical convertor is preferably a piezoelectric transducer, in particular a ceramic material such as barium titanate zirconate. In general, the material should have a high capacitance, and generate a high voltage when stressed.

In the case of a defibrillator, the piezoelectric transducer or other electromechanical convertor can be connected substantially directly to the choke coil through which the electrical energy is applied to the patient. The large storage capacitor, and high-capacity relay, used in conventional defibrillators, are eliminated, together with the conventional electrical power supply, thereby greatly reducing the cost, weight and size of the defibrillator.

Instead of these components, the defibrillator will contain a piezoelectric body with electrodes, a small explosion chamber adjacent to this, and a trigger mechanism for firing an explosive charge in the said chamber. The chamber and the mounting for the piezoelectric transducer must of course be sufficiently strong to withstand the pressures due to explosion but if modern piezoelectric electric materials are used, an electrical output adequate for defibrillation can be obtained using a relatively small explosive charge. For convenience, the explosive charge may be a cap or blank cartridge as used in rivet or nail guns or starting guns.

Defibrillation usually requires an electrical discharge of about 400 J. This can be obtained from a barium titanate or lead zirconate ceramic piezoelectric transducer.

A defibrillator embodying the present invention can be mass-produced at a fraction of the cost of conventional defibrillators using battery or mains power supplies. It can be very portable, and can be used as a standby device in situations where it will only be required at long intervals. For such use it is simpler, more reliable and cheaper than a battery-operated defibrillator, as it is not necessary to monitor battery condition or to replace expensive batteries at short intervals to ensure reliability. Explosive caps and the like do deteriorate with time, but are very cheap and easy to replace and can be expected to remain effective longer than most replaceable batteries. Although secondary batteries can provide long-term reliability, they require constant recharging and have only limited capacity for repeated use, whereas the present defibrillator can be used as often and as fast as the explosive caps can be inserted.

It may be advantageous to couple the piezoelectric transducer to a mechanical oscillator such as a spring or turbine in order to reduce peak stresses and lengthen the output energy burst. The transducer may be spring-mounted, or alternatively the explosion pressure may be applied to it through a spring, or a turbine driven by the explosion gases and arranged to strike the transducer as the turbine rotates. In this case, full-wave rectification of the electrical output from the transducer will usually be required.

Figure 1:
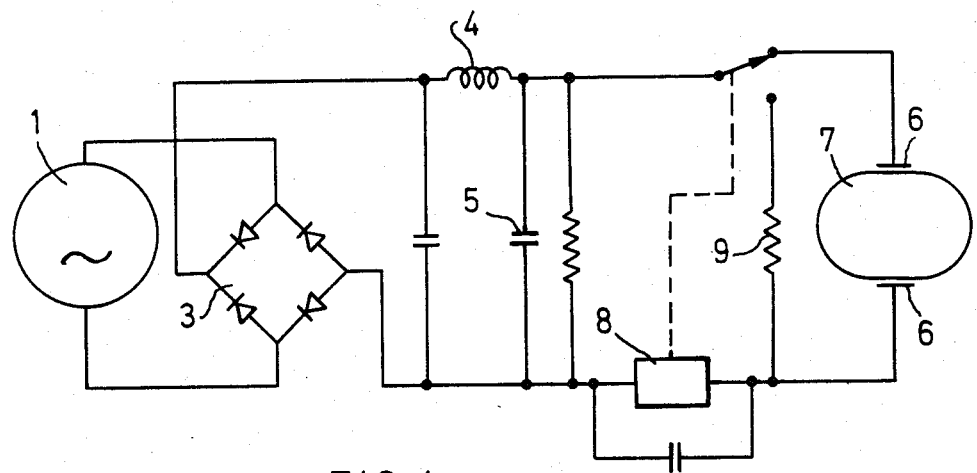
FIG. 1 is a circuit diagram of a defibrillator embodying the invention.

The defibrillator shown in FIG. 1 has an energy source or generator 1 embodying the present invention, for example as described more fully below. In one simple arrangement, the generator comprises a block of ceramic piezoelectric material exposed to the interior of an explosion chamber shaped to receive an explosive cap and associated with a trigger mechanism of any suitable kind, for firing the cap to release energy into the chamber and thereby to stress the piezoelectric material. The applied stress, as is well known, causes the piezoelectric material to generate a voltage and this is applied to a discharge circuit comprising a rectifier 3, choke coil 4 and capacitor 5, to which are connected conventional electrodes 6 for application to the body of a patient 7. A resistor 9 is connected in parallel with electrodes. In order to control the pulse length of the defibrillation pulse applied to the patient, a relay 8 is arranged to divert the discharge from the patient into the resistor 9 after a predetermined pulse duration. In operation, the user simply applies the electrodes to the patient, inserts the explosive cap, and pulls the trigger. The great simplicity of construction and use will be obvious.

The defibrillator may have a cap magazine and cap ejection mechanism to facilitate repeated use. The number of discharges available is limited only by the number of caps available. The design of explosion chambers, triggers, magazines and ejectors is well known and therefore these features will not be further described herein.

Sound insulation may be provided to mulffle the noise of the explosion.

Depending on the power required, the generator may contain more than one piezoelectric element, and may fire more than one cap at a time.

The layout of the defibrillator can generally correspond to that of known portable defibrillators, comprising for example a main case, containing the generator most or all of the electrical circuitry, the trigger and one electrode, together with a second electrode which is separate but is electrically connected to the circuitry in the case. Such a defibrillator can be used very easily, by holding the case in one hand and the separate electrode in the other hand, applying the case with its electrode, and the separate electrode to the patient, and then pulling the trigger on the case. Alternatively, both electrodes can be mounted on the case. A further possible arrangement comprises a power unit containing the generator and circuitry, and two separate electrodes connected to it.

It may be advantageous to apply the energy to the piezoelectric transducer or transducers by way of an intermediate machanical element such as to stress the transducers cyclically, so that the output is a pulse train or alternating voltage instead of a single pulse.

Figure 2:
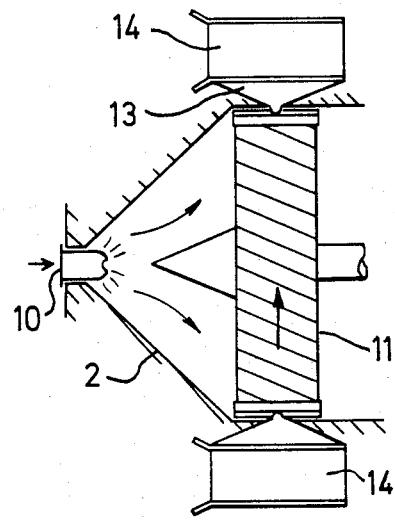
FIGS. 2 and 3 are schematic side and end views of a power source embodying the invention.
Figure 3:
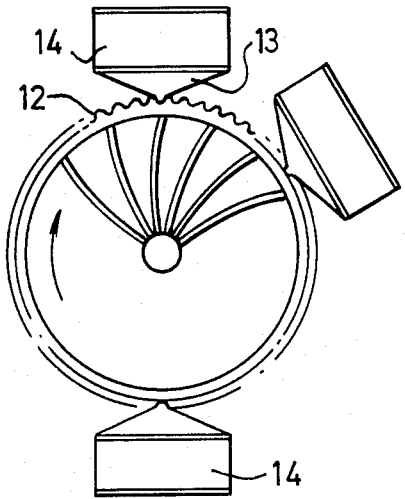

FIGS. 2 and 3 show schematically such a mechanism. A metal housing defines the explosion chamber 2, into which an explosive cap or other thermal charge 10 is inserted at a narrow end, at which is provided a suitable firing mechanism for the charge. The chamber contains a freely rotatable turbine rotor 11, arranged so that the gases produces by firing of the thermal charge, passing through the rotor, will make the latter spin rapidly. The periphery of the rotor forms a corrugated rim 12 which engages axial percussion end pieces 13 of radially mounted piezoelectric crystal packs 14 connected in tandem groups.

In operation, as the rotor spins it applies cyclic percussion stress to the piezoelectric packs so that these produce electrical pulse trains, which are full-wave rectified for charging the defibrillator circuitry.

The advantage of such an arrangement is that it reduces the peak stresses on the piezoelectric transducers and extends the output energy burst.

Figure 4:
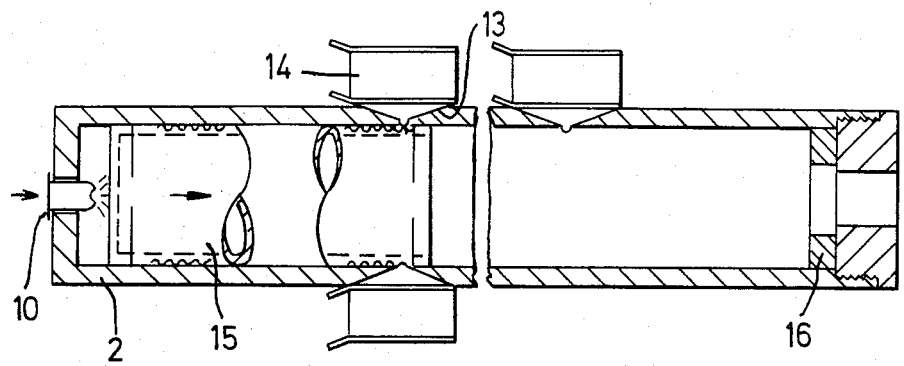
FIG. 4 is a schematic longitudinal section of a further power source embodying the invention.

FIG. 4 shows a modification in which the explosion chamber 2 is rectilinear and the thermal charge 10 drives a hollow plunger 15 with a corrugated surface which acts on radially mounted piezoelectric crystal packs 14 connected in tandem groups fitted with axial percussion cones 13. At the opposite end of the metal housing 15 containing the explosion chamber, is a buffer and/or plunger return assembly 16 for returning the plunger to its starting point.

Instead of piezoelectric transducers, the expanding gases from the thermal charge may drive an electromagnetic generator. For example, the gases may drive a small turbine carrying magnets which are thus driven through or past generator coils to provide an electrical current burst.

Figure 5:
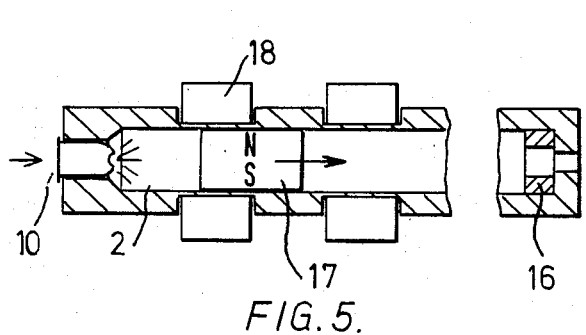
FIGS. 5 to 8 illustrate schematically further power sources embodying the invention.
Figure 6:
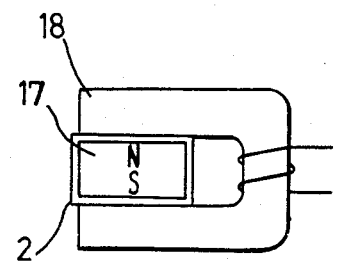

FIGS. 5 and 6 show an electromagnetic generator analogous to the piezoelectric generator shown in FIG. 4. The plunger 15 is replaced by a permanent magnet or magnet pack 17, and the piezoelectric packs are replaced by radially mounted iron armatures 18 wound and connected in series and/or parallel groups.

Alternatively, in an electromagnetic analogue of the generator shown in FIGS. 2 and 3, a permanent magnet rotor driven by the thermal charge rotates within one or more windings which generate the electrical output.

Figure 7:
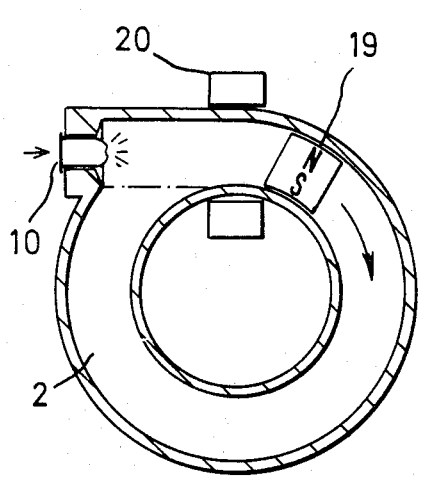
Figure 8:
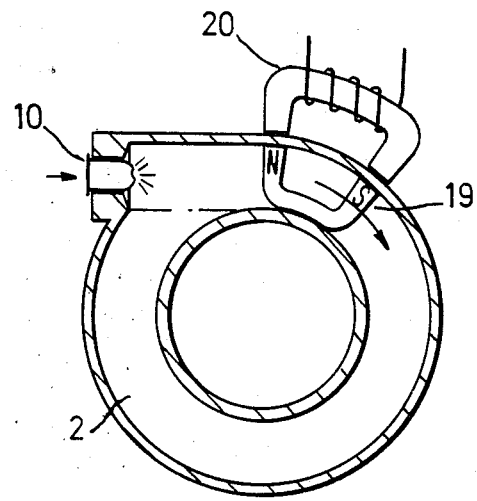

FIGS. 7 and 8 show a further arrangement in which an annular explosion chamber 2 contains a rotatable permanent magnet assembly 19 attached to a rotor or carriage so as to be driven round the chamber by the thermal charge 10. Adjacent to the chamber are one or more radially mounted iron armatures 20 wound and connected in series and/or parallel groups, with pole pieces past which the permanent magnet assembly is driven so as to generate current in the windings applied to the armatures. The rotor may have more than one permanent magnet assembly. The explosion chamber is defined in a circular or volute metal housing, incorporating a buffer/return assembly for the permanent magnet assembly. The magnet poles may be spaced radially as in FIG. 7, or circumferentially as in FIG. 8.

References to explosive devices and thermal charges herein comprise propellent charges and, in general, all types of device which rapidly convert stored chemical energy into thermal or mechanical energy.

I claim:
1. An electrical energy source comprising:
    (a) a chamber with which at least one piezoelectric transducer is operatively associated;
    (b) an explosive cartridge associated with said chamber for generating gases therein in response to actuation of said cartridge;
    (c) a member movably mounted in said chamber for displacement relative to the transducer in response to said gases; and
    (d) means on said member for repeatedly striking said transducer when said member is displaced in the chamber by said gases thereby causing the transducer to produce a train output pulses.

2. An electrical energy source according to claim 1 including a rectifier for rectifying the electrical output of the transducer when the latter is repeatedly struck by displacement of said member in said chamber.

3. An electrical energy source according to claim 2 including a cardiac defibrillator connected to the output of the rectifier.

4. An electrical energy source according to claim 3 including an electrical filter interposed between the cardiac defibrillator and the output of the rectifier.

5. An electrical energy source according to claim 1 wherein said member is rotatably mounted in the chamber and is constructed and arranged so that said gases angularly displace said member.

6. An electrical energy source according to claim 5 wherein said member is provided with blades against which said gases react for imparting angular displacement to the member.

7. An electrical energy source according to claim 6 wherein the periphery of said blades is corrugated, the peaks of the corrugations physically striking said transducer during angular displacement of the member.

8. An electrical energy source according to claim 6 including a plurality of transducers mounted on said chamber.

9. An electrical energy source according to claim 1 wherein said member is cylindrical and is longitudinally slidable in said chamber, and is constructed and arranged so that said gases axially displace said member.

10. An electrical energy source according to claim 9 wherein the outer surface of said member is corrugated, the peaks of the corrugations physically striking said transducer during axial displacement of the member.

11. An electrical energy source according to claim 10 including a plurality of transducers mounted on said chamber.

12. An electrical energy source according to claim 11 wherein said transducers are angularly spaced from each other on the chamber.

13. An electrical energy source according to claim 11 wherein said transducers are axially spaced from each other on the chamber.

14. A cardiac defibrillator system comprising:
(a) a cardiac defibrillator;
(b) an energy source for said defibrillator including a replaceable cartridge for generating gases in response to actuation of said cartridge; and
(c) means responsive to said gases for generating power for said defibrillator including a chamber to which said gases are applied, at least one piezoelectric transducer operatively associated with said chamber, a member movably mounted in said chamber for displacement relative to said transducer in response to said gases, and means on said member for repeatedly striking said transducer when said member is displaced in said chamber by said gases.

15. A cardiac defibrillator according to claim 14 including a rectifier circuit for rectifying the output of said transducer.

16. A cardiac defibrillator system according to claim 15 including a filter for filtering the output of said rectifier.

* * * * *